United States Patent [19]

Jaquith

[11] 4,030,356
[45] June 21, 1977

[54] CONTINUOUS WEIGHING MECHANISM FOR FLUIDS

[75] Inventor: Burton Kent Jaquith, Fort Lauderdale, Fla.

[73] Assignee: Technical Industries, Inc., Fort Lauderdale, Fla.

[22] Filed: Mar. 28, 1975

[21] Appl. No.: 563,093

[52] U.S. Cl. .................................. 73/195; 73/219; 119/14.17
[51] Int. Cl.² ...................... G01F 3/26; A01J 5/00
[58] Field of Search .................. 73/195, 217, 219; 119/14.01, 14.08, 14.14, 14.15, 14.17, 14.18; 177/94

[56] References Cited

UNITED STATES PATENTS

| | | | |
|---|---|---|---|
| 2,998,722 | 9/1961 | Jaquith | 119/14.17 X |
| 3,144,046 | 8/1964 | Seesselberg | 73/195 X |
| 3,623,052 | 11/1971 | Spiller | 340/239 R |
| 3,705,533 | 12/1972 | Kahl et al. | 177/94 X |
| 3,738,170 | 6/1973 | Maeshiba | 73/217 |
| 3,754,220 | 8/1973 | Sztamler et al. | 340/239 R |
| 3,773,016 | 11/1973 | Needham et al. | 119/14.08 |
| 3,821,726 | 6/1974 | Chang et al. | 340/239 R |
| 3,878,819 | 4/1975 | Harman | 119/14.08 |

Primary Examiner—Richard C. Queisser
Assistant Examiner—John S. Appleman
Attorney, Agent, or Firm—James J. Mullen

[57] ABSTRACT

A continuous weighing mechanism, which contains a fluid receiver mounted upon a rocker shaft, said receiver and a portion of said rocker shaft contained within a housing which is supported by a frame, and a fluid flow indicating device, for use with a conduit system wherein a fluid material is moved and is weighed by said mechanism, said device comprising (a) a magnet which is adapted to be detachably connected to said rocker shaft on that portion thereof which is outside said housing; (b) an electromechanical switch which is adapted to be mounted on said frame, said switch being in electromagnetic relationship with said magnet so that movement of said magnet can activate said switch; (c) a control module containing input and output circuits, disposed remotely from said switch and interconnected therewith by suitable electrically conductive means, said control module adapted to receive a signal from said switch through said input circuit and upon preset circuitry conditions, activate an outside electrical power supply through the said output circuit.

6 Claims, 18 Drawing Figures

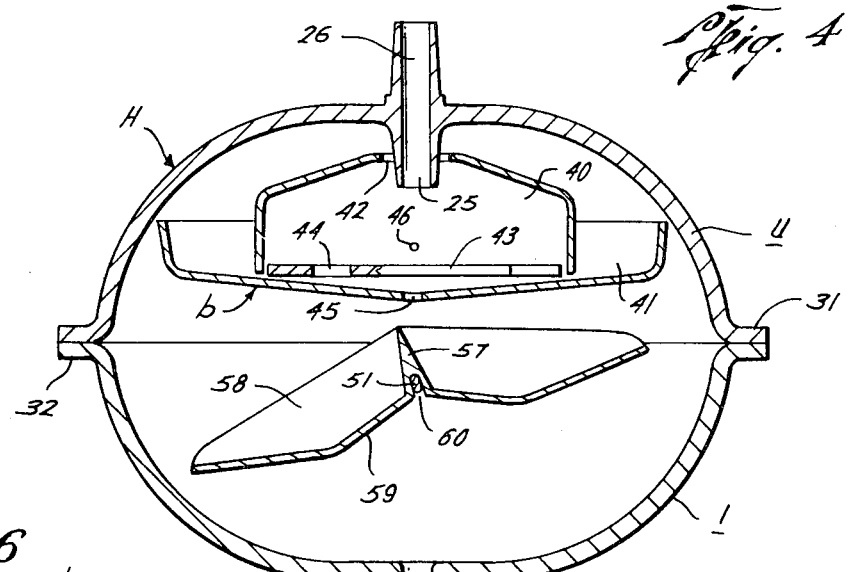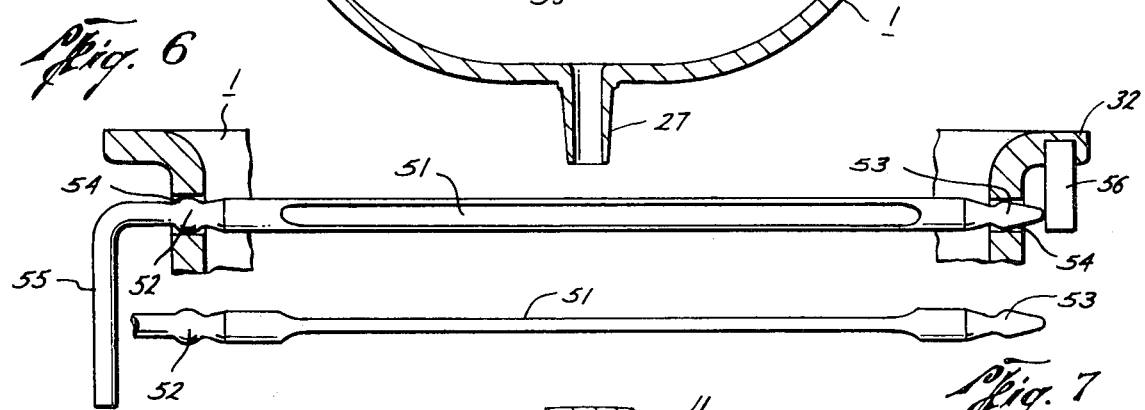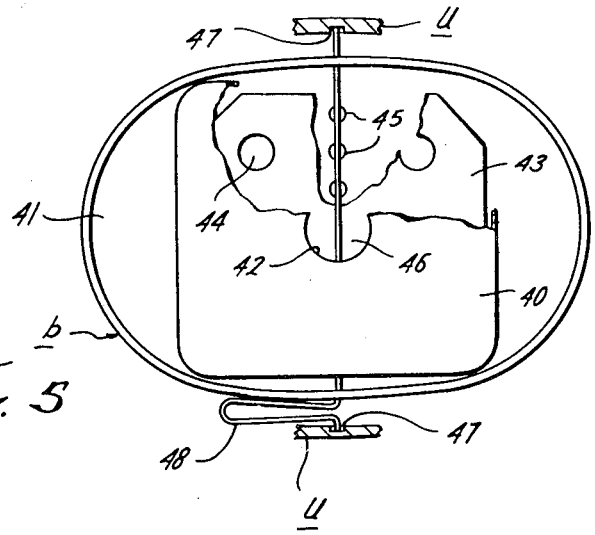

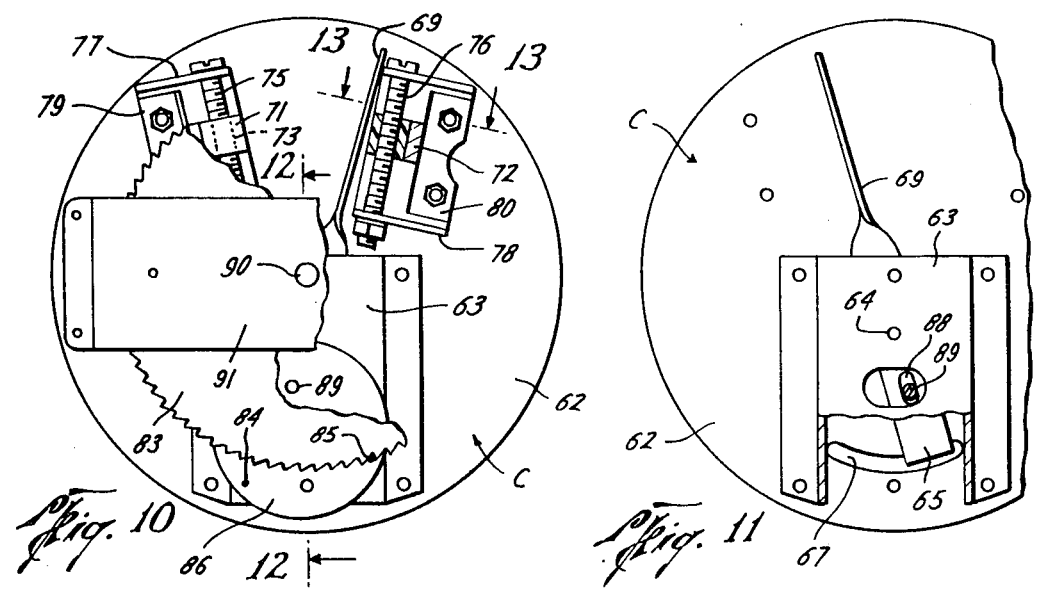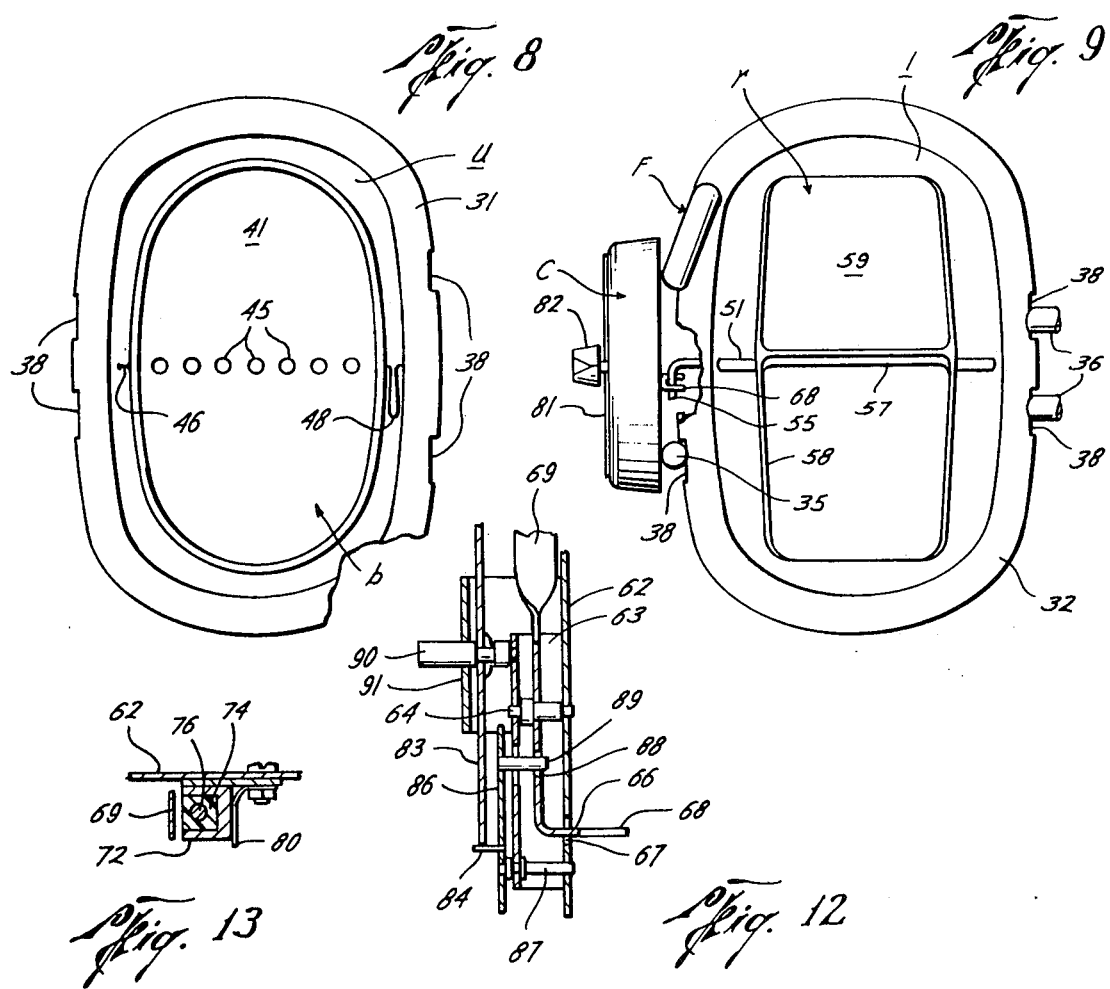

CONTINUOUS WEIGHING MECHANISM FOR FLUIDS

RELATED PATENT APPLICATIONS

This patent application and applicant's patent application entitled "Temperature Indicating Device for Fluids," filed concurrently herewith, contain common subject matter and consequently this latter mentioned patent application, including the drawings therein, should be considered as incorporated herein, in toto, by reference for all intents and purposes.

PRIOR ART

The prior art considered in conjunction with the preparation of this case are as follows: U.S. Pat. Nos. 2,625,643; 2,755,999; 2,892,347; 2,898,549; 2,917,926; 2,998,722; 3,022,766; 3,111,113; 3,163,047; 3,231,179; and 3,438,399. All of these publications should be considered as incorporated herein, in toto, by reference for all intents and purposes.

BACKGROUND OF THE INVENTION

The present invention relates in general to an improved gravimetric scale mechanism for weighing fluids while in continuous motion. More particularly, the present invention relates to fluid collection systems and means to monitor the rate of flow of a fluid from an animal during the milking operation thereof. The present invention more preferably relates to an improved gravimetric weighing mechanism which provides, in part, an accurate and simple means of detecting when an animal such as a cow ceases to produce milk during the milking operation thereof.

In conjunction with the description contained herein, it is to be understood that the present invention has applicability to numerous types of materials in motion including liquids ranging widely in viscosity and characteristics, granular substances capable of fluid motion and various combinations thereof. However, as a specific example, the subsequent description will be concerned with milk in its flow from a cow through a conduit system which includes a milking machine, a weighing mechanism for said fluids, a collection container and a vacuum pump which exerts a subatmospheric pressure in the overall system.

In conjunction with the milking of animals such as cows, one of the basic problems relates to the early detection of when a cow is "milked-out." If the milking operation continues after such milked-out period, serious irritation of the cow's teats of the udder by the milking machine can result. Furthermore, there is a risk of subsequent inflammation which may result in infections such as mastitis which in turn is injurious to the animal and consequently it may decrease production and/or result in substandard milk.

Regarding the milking of animals such as cows, the prior art appears to have recognized this problem of animals being milked-out and the need for early detection thereof. However, one of the disadvantages of the prior art devices which have been suggested to solve this problem has been that all of said devices are based upon one minimum flow and are volumetric in nature. For example, at anytime the animal fluid flow output falls below the present level of such prior art device which is being used a signal output is energized. Under these circumstances, however, there are numerous disadvantages. In actual milking practice, such a simplified procedure resulting from a temporary shut down of milk flow can effect the tightening of the teats sphincter muscles, after a truck backfires, a dog barks, a stranger walks into the barn and the like. Thus, it can be seen that with this one time volumetric flow operation, this secondary let down of milk output is not recognized. Consequently, it can thus be seen that there is a need in the art for a fluid flow indicating device as used in combination with a continuous weighing mechanism for fluids, and both as used in combination with the conduit system in order to overcome the disadvantages heretofore set forth.

Accordingly, it is one object of the present invention to provide an improved continuous weighing mechanism which is simple in construction but is highly effective when utilized, for example, in a fluid conduit system.

Another object of the present invenion is to provide a continuous weighing mechanism for fluids which is adapted to monitor the fluids passing therethrough and a termination of fluid flow.

A salient object of the present invention is to provide a milk collection system which utilizes a continuous weighing mechanism which monitors fluids passing therethrough and upon preset conditions, remotely disposed therefrom, cause the activation of a device, such as a warning light, to indicate the termination of fluid flow.

A further object of the present invention is to provide an apparatus for the constant monitoring of an animal's fluid output during a milking period to detect the milked-out point and prevent irritation of the animal's teats and any resultant infection thereof.

These and other objects of the present invention will be readily apparent from the subsequent description including the claims and drawings.

BRIEF DESCRIPTION OF THE INVENTION

The disadvantages heretofore mentioned in conjuncton with the prior art are overcome by the present invention which comprises in one part a fluid flow indicating device and in another part the combination of the fluid flow indicating device and a continuous weighing mechanism for fluids, preferably a gravimetric operated apparatus. The fluid flow indicating device in general comprises a magnet which is detachably maintained on the rocket shaft (which supports the fluid receiver) of said weighing mechanism. A magnetic field proximity switch, such as a "reed" switch, is connected with said weighing mechanism and is in electromagnetic relationship with said magnet. When the fluid receiver is filled, the shaft rotates and thus causes the magnet to pass over the surface of the switch. The switch is then activated and a signal is transmitted through a shielded connector cord. The switch is self-contained with a suitable connector cord on the end thereof.

The shielded connector cord terminates in a plug assembly on the opposite end from said switch. This facet is an essential part of the device in that the complete disassembly of the milk collection system or portions thereof for cleaning is necessary for sanitation purposes and therefore each device must be independent since as a practical matter there is no assurance that a specific device will be interconnected with a specific control module (herein defined) or recording device in subsequent milkings.

The opposite end of the switch terminates as previously mentioned with a connector which in turn is adapted to be fitted into a control box in a female-male type (receptical/plug) relation. Within the control box, a "mother" board is adapted to connect a solid state electronic timing/monitoring circuit (control module). The control module is so designed in circuitry that a precise timing sequence, actuated by the reed switch, can be detected; thus, a frequency over the pre-calibrated values actuates AC lines and subsequently energizes a visual indicator, monitoring recorder or the like.

It has been found that the fluid flow indicating device used in conjunction and in combination with the continuous weighing mechanism provides an extremely accurate means of detecting when animals are milked-out.

IN THE DRAWINGS

The present invention is more clearly understood from the subsequent detailed description taken in conjunction with the accompanying drawings which illustrate as a specific example embodiment of this invention as designed for and applied to a typical closed conduit system starting with the claw at the udder of a cow and ending with a receptical wherein milk is collected.

It is to be understood that FIGS. 1–13 will be a type of continuous weighing mechanism which can be utilized in the present invention and which has been modified to show the present invention as pointed out in FIGS. 14–18.

Accordingly, in the drawings:

FIG. 4 is an enlarged vertical section through the mechanism housing, taken on line 4—4 of FIG. 3, the supporting frame for the weighing mechanism being omitted from the view for clarity of illustration;

FIG. 5 is a top plan view of the baffle unit per se, portions of adjacent walls of the housing upper shell being shown in horizontal section;

FIG. 6 is an enlarged detail in side elevation of the rocker shaft shown in relation to certain openings in the walls of the housing (exhibited in section) wherein it is journaled for oscillatory movements;

FIG. 7 is a top elevation of the same shaft;

FIG. 8 is a bottom plan view of the housing upper shell together with the baffle unit positioned therein;

FIG. 9 is a top plan view of the housing lower shell together with the supporting frame therefor and the rocker tray therein;

FIG. 10 is a front elevational view of the weight control and counter device from which the dial and face plate are omitted to exhibit other parts therebehind;

FIG. 11 is a similar view with the counter escapement wheel removed to expose additional parts, the magnets being also omitted from the view;

FIG. 12 is a detail in section, taken on line 12—12 of FIG. 10;

FIG. 13 is a similar view, taken on line 13—13 FIG. 10;

DETAILED DESCRIPTION OF THE INVENTION

Figure 1:
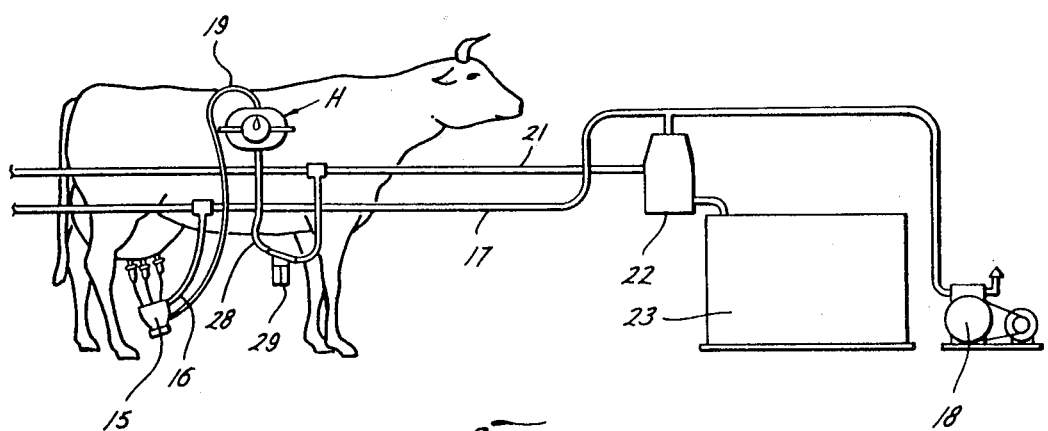
FIG. 1 illustrates more or less diagrammatically a typical milk conduit system of the general kind with which a weighing mechanism may be advantageously used.

In FIG. 1, there is illustrated a closed conduit system through which a pulsating fluid is drawn in response to operation of a vacuum pump. Such a system is more or less common with present day milking machines. It comprises a claw 15 having teat cups applicable to the udder of a cow and provided with a flexible connection 16 leading to the air line 17 and a vacuum pump 18; also a flexible connection 19 leading to the housing H of the weighing mechanism which is interposed in the milk line 21 leading to a releaser 22 (for separating air from the milk) en route to the tank 23 wherein the accumulating milk is refrigerated and stored. Into and through such a conduit system which is closed and wherein a subatmospheric (minus) pressure is constantly maintained, the milk is drawn while pulsated in response to operation of the vacuum pump. To determine accurately the weight of the milk delivered at the source, i.e. the yield of the cow, while the milk is passing uninterruptedly to the storage tank, is the primary function of the weighing mechanism in the particular environment illustrated in FIG. 1.

Figure 2:
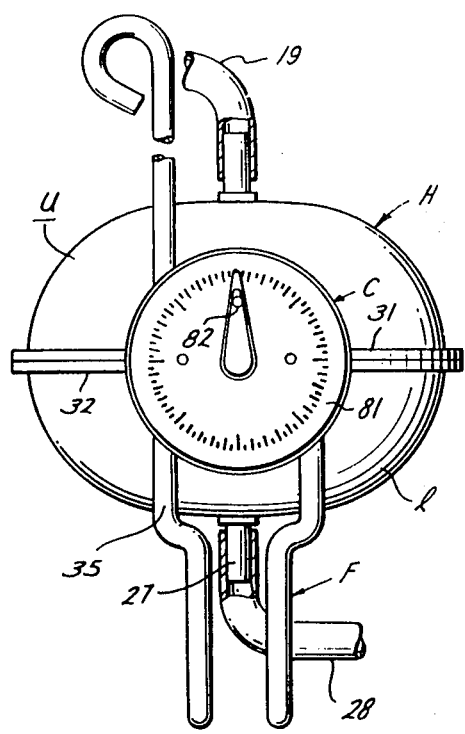
FIG. 2 is a front elevation of a weighing mechanism per se.
Figure 3:
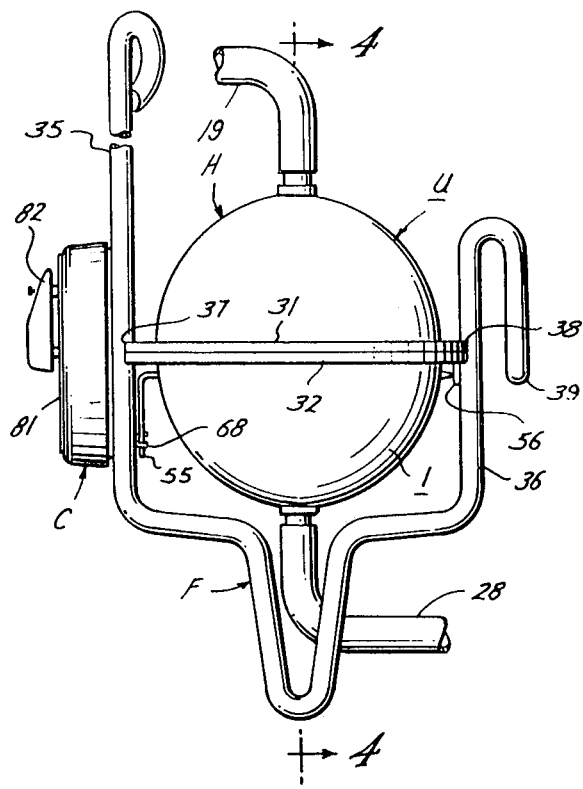
FIG. 3 is a side elevation thereof.

The weighing mechanism enclosed within the housing H comprises (FIG. 4) two complementary bowl-shaped shells, one upper $u$ and one lower $l$, defining between them an elongated closed chamber through which the fluid material is continuously circulated while weighed. At the top of the upper shell $u$ is an inlet in the form of a nipple extending both inwardly of the chamber at 25 and outwardly thereof at 26 to facilitate connection therewith of the flexible pipe 19 (FIG. 1) leading to the conduit through which is flowed the fluid material to be weighed. An outlet nipple 27 provided at the bottom of the lower shell $l$ may be joined as by a flexible connection 28 (FIG. 1) to the conduit line 21 to deliver the weighed material to the point of its discharge, such as the tank 23. A sampler 29 interposed in the connection 28 retains a true proportionate sample of the fluid material convenient for testing. Along their meeting edges the two shells are provided with outturned flanges 31 and 32 which interengage to form a tight joint therebetween. A supporting frame F for the housing H is also provided and, as shown, (FIGS. 1 and 2) this comprises a bar of round cross section bent to provide two pairs of spaced vertical legs front and rear, 35 and 36, respectively, arranged to receive between them the upper and lower shells $u$ and $l$ of the housing. These four legs are notched at 37 at points where they may engage coacting notches 38 in the out-turned shell flanges 31 and 32 to secure the two shells closely and firmly together (FIG. 3). The upper end portions of the two rear legs 36 which are integral are formed into a down-turned hook 39 to facilitate attachment of the frame F and housing H to a bracket (not shown) affixed to the pipe stanchions or pipe lines which are commonly provided in milking parlors.

The upper shell $u$ accommodates within itself a baffle unit $l$ which, as shown, comprises an open-bottom baffle box 40 whose depending walls rest upon a baffle drain pan 41. At its top center the baffle box is apertured at 42 where it loosely surrounds the depending nipple 25 in spaced relation thereto. A baffle plate 43 which is confined within the depending walls of the baffle box 40 and rested loosely upon the baffle drain pan 41 is formed with openings 44 through which fluid material may drain into the pan. The baffle drain pan 41 itself is elongated in general conformity with the contour of the housing shells, and its bottom is pitched from opposite ends downwardly to its low point in the center which takes the form of a transversely extending shallow gutter wherein a plurality of aligned drain openings 45 are provided. The baffle unit $b$ wherein the incoming fluid first enters serves as a receiving staion wherein deaeration and depulsing of the material takes place. While halted at this station, the fluid body is quieted and relieved of any entrapped air whose presence would otherwise tend to prevent a smooth even flow thereof. This is important in order that the scale mechanism presently to be described may function accurately and speedily.

The fluid material upon leaving the baffle unit $b$ descends through the drain openings 45 into a lower part of the housing chamber along a line which extends transversely thereof at the longitudinal center of the housing. To support the baffle unit in place, an elongated pin 46 is extended between opposite walls of the upper shell $u$ and through like walls of the baffle box 40 and baffle pin 41 wherein suitable openings are provided for the purpose. Opposite ends of this pin are rested within sockets 47 (FIG. 5) formed on the inner faces of the upper shell $u$ to provide support for the pin and its associated parts. One end portion of the pin (FIG. 5 and 8) is formed into a spring handle 48 which, when compressed, pushes the opposite pin end portions away from each other for secure engagement within the supporting sockets 47; this handle also facilitates manipulation of the pin whenever the baffle unit $b$ is to be disassembled or reassembled for replacement within the housing. Manifestly each of the parts comprised in the baffle unit may be readily separated from the others for facile cleaning and sanitizing.

Within the lower shell $l$ is a scale receiver $r$ movable through a fixed path. In the embodiment shown, this receiver is in the form of an elongated tray mounted at its center point upon a rocker shaft 51 extending transversely of the housing. For the major portion of its length, through its center portion, the shaft 51 is flattened but opposite end portions are rounded out and formed into ovals or balls 52 and 53 of unequal diameters, each adapted for circular line engagement within aligned, closely surrounding, cylindrical bearings in the form of openings 54 which extend through the walls of the lower shell $l$. The oval 52 is slightly larger in diameter than is the oval 53 and the shaft end portion proximate thereto is turned transversely of its axis of oscillation to provide a crank arm 55. The opposite shaft end proximate to the smaller oval 53 abuts a post 56 which depends from the flange 32 of the lower shell $l$, the purpose being to provide an end thrust bearing therefor. In periods of non-operation the shaft may freely be removed from the lower shell $l$ by an endwise movement in a direction away from the post 56; but with the vacuum pump in operation to draw milk through the conduit system a sufficient minus pressure is maintained within the two shells of the housing H whereby the higher external pressure exerts a force upon the larger oval 52 in excess of that upon the smaller oval 53 to hold the shaft in the endwise position shown in FIGS. 3 and 6 where it is engaged with the post 56.

A partition wall 57 transversing the rocker tray $r$ centrally thereof is joined to side and bottom walls 58 and 59, respectively, thereby to define two fluid-tight compartments of identical capacity. The base of the partition wall 57 is widened to accommodate for its length a slot 60 open along its bottom to rest upon the flatted portion of the shaft 51 with whose opposite faces it is engaged nonrotatably. The cylindrical end portions of this shaft are disposed outwardly of the tray side walls 58 and serve as means to prevent shifting of the tray upon the shaft endwise thereof. The shaft-tray assembly is exactly balanced but with capacity for rocking movement between two fixed positions in either of which the bottom of the tray compartment which is down will be inclined downwardly, to rapidly spill through its open end the fluid load that has previously been deposited therein.

FIG. 4 illustrates the receiver $r$ in discharge position for the compartment of its lower (left) end. While so positioned, the partition wall 57 is also inclined to the left so that its upper edge is disposed to the left of the drain openings 45 in the gutter of the baffle drain pan 41 thereabove; material flowing by gravity through these openings will accordingly be discharged into the tray upper compartment (to the right as shown in FIG. 4). Filling of this upper compartment starts after emptying of the lower compartment to the left has been well under way. All the fluid material in the lower (left) compartment will, therefore, be discharged therefrom before any considerable filling of the upper (right) compartment has taken place. By providing drain openings 45 of an aggregate area requisite for proper regulation of the flow of material passing therethrough, a complete emptying of the discharging (down) compartment can be assured before a predetermined weight of the material can accumulate within the receiving (upper) compartment. By this means each filling of the upper compartment will proceed to the point of depositing therein material having a predetermined weight so that it is possible to ascertain, with the aid of an accumulating counter device C (hereinafter described), the exact quantity of material, by weight, which has flowed through the gutter openings 45 to move the receiver $r$ through its cycles during the entire period of operation.

With continued discharge of material through the gutter openings 45, the two-compartment scale receiver $r$ is repeatedly operated through its cycle to move between two positions in one of which the filled compartment is emptied and the other filled (but with very little time loss), and vice versa. However, the factors of speed and of accuracy must be constantly reckoned with, and without the provision of certain means to fix the time requisite for movement of the receiver $r$ between its two positions, the weighing mechanism would probably fall short of meeting many industrial requirements. The provision of such control means will now be described.

Affixed to the front legs 35 of the frame F is a mounting plate 62, which carries a weight control and counter device C. (See FIG. 10-12.) This plate also supports a U-shaped bracket 63 whereon is pivotally mounted at 64 a magnet arm 65 in the general form of a strip. One end portion 66 of this arm is laterally turned to extend rearwardly through an arcuate slot 67 that is formed in the plate 62; the end 66 so projected through the mounting plate is bifurcated at 68 to receive the crank arm 55 of the receiver shaft whereby to transmit oscillatory movements thereto. The opposite end portion 69 of the magnet arm 65 is twisted through 90° to present its flat faces in confronting relation to a pair of spaced permanent magnets 71 and 72, each of U-shape in cross section (FIG. 13) to accommodate a fixed plastic core. Through these cores 73 and 74 are extended transversing adjusting screws 75 and 76 which are rotatably supported in brackets 77 and 78, respectively. The axes of the screws 75 and 76 diverge from a point lying in a vertical plane which aproximately intersects the pivotal axis 64 of the magnet arm 65, and at a point somewhat therebelow. By this arrangement the end portion 69 of the magnet arm is free to swing between the two magnets through a movement range that is determined by the brackets 77 and 78 which serve also as stops therefor. Angled spring strips 79 and 80 extending parallel with the adjusting screws 75 and 76 maintain a pressure engagement with the two magnets 71 and 72 in all adjusted positions thereof to prevent any loose play upon their mountings and assure against any deviation from the exact positions wherein they are adjusted.

FIG. 10 shows one position of adjustment wherein the brackets stop the end 69 of the magnet arm at points slightly spaced from the two magnets; by adjusting the screws 75 and 76 each magnet may be raised or lowered, and in consequence brought further toward or away from the magnet arm end 69 to thereby vary the air gap therebetween. It is possible, therefore, to increase or decrease the effective magnetic forces operable upon the magnet arm end 69 to influence its oscillations between the two bracket stops 77 and 78. This is important because this adjustment is the control over the weighing properties of the mechanism herein described.

The counter device C may be of any approved type. The one here illustrated is equipped with a circular dial 81 around which a pointer 82 is moved to register, by weight, the quantity of fluid material that is passed through the weighing mechanism (FIG. 2). This counter device comprises a toothed escapement wheel 83 certain of whose teeth are alternately engaged by a pair of pins 84 and 85 extending from a pawl 86 at the end of a shaft 87 which is pivotally supported by the mounting plate 62 and bracket 63 (FIGS. 10-12). Oscillatory movements are transmitted from the magnet arm 65 wherein is a slot 88 engageable by a pin 89 which is extended therethrough from the pawl 86 for operation thereof. The escapement wheel 83 is frictionally secured upon a shaft 90 which is rotatably supported upon the bracket 63 and upon a second outer bracket 91 which is carried upon the mounting plate 62 (FIGS. 10 and 12). At its outer end the shaft 90 carries fast the pointer 82 to advance the same around the dial 81. This pointer 82 may be manually reset to zero whenever desired, the escapement wheel then standing still while the shaft 90 is rotated to permit of such adjustment. By the means described, each movement of the receiver r transmits motion to the escapement wheel 83 to rotate it through the distance of one tooth and advance the pointer accordingly. The operating parts of the counter device C may be enclosed within a suitable case as is commonly done with such instruments.

The particular materials used for the different parts of the weighing mechanism should be carefully chosen with due regard to the nature and charcteristics of the fluids to be circulated therethrough. For example, if milk be the fluid, then the important considerations of non-toxicity and sanitation will rule out many materials as unfit. Stainless steel is generally approved in this industry, and also certain plastic materials. For lightness, cleanability, and general serviceability the plastic known as methyl methacrylator polymer is entirely satisfactory for the two shells of the housing H, the baffle unit b and the receiver r. The property of lightness in relation to weight which inheres in such a plastic makes it especially desireable for the receiver with a view to minimizing its weight and consequent inertia when in operation. Inasmuch as this material is somewhat flexible, the walls of the housing H (if then, as is desirable for purposes of weight reduction) will undergo flexure in response to operation of the vacuum pump, thereby tending to misalign the axes of the two cylindrical bearings 54.

Any such flexure would tend to create a binding pressure on the shaft 51 whose end portions are journaled for oscillatory movements therein. Any such effect is obviated, however, by rounding outwardly the shaft end portions into the two ovals or balls 52 and 53 which maintain a continuous circular line engagement within their bearings even through the housing walls may undergo flexure during periods of operation while maintaining their close fit within the supporting bearings therefor. For the baffle unit pin 46 and receiver shaft 51, stainless steel is an approved material where milk is the fluid to be weighed. Manifestly, where other and different fluids are to be passed through the weighing mechanism, there is a wide choice of materials available for the housing and all operating parts threwithin, provided only that they meet all the requirements, atmospheric and otherwise, imposed by the special conditions encountered in their use.

To attain a high degree of accuracy in the weighing operation, it is important that the factor of inertia in all movements of the scale receiver r be held to the minimum, and also that adjustable means, additional to gravity, be provided to accelerate and control all movements of the receiver between its receiving and discharging positions. The very light weight of the balanced scale receiver is relied upon to cancel out most of the inertia, and the provision of the pair of co-acting magnetic means 69 and 71 (or 72) serves effectively to speed the movements of the receiver between its two positions. The influence of the coacting magnetic means may readily be varied by proper adjustment of the adjusting screws 75 and 76, one or both of them, to widen or narrow the air gap between them thereby affecting the time interval required for operation of the receiver r through its cycle. Each movement of the receiver r is controlled by the magnets 71 and 72 and therefore the subsequent weight of that measure of fluid. In effect, the weight of the fluid in the one compartment of the receiver r is suspended by the magnetic attraction of the magnet 71 (or 72) for magnet arm 69 through the interconnected mechanical linkage previously described. Since one of the inherent properties of a permanent magnet is a rapid and increasing reduction of magnetic attraction with only a slight increase in air gap, a relatively slight movement of the magnet arm 69 by the accumulated fluid reaching the predetermined weight supportable by the magnetic attraction, for all practical purposes leaves the filled receiver compartment unsupported.

While the movement of the receiver r is relatively rapid, it is accelerated through its arc of travel since the movement of fluid toward the end of the compartment is continually moving the center of gravity of the contained fluid toward the discharge end of the receiver compartment. At the end of travel the fluid will completely drain from the receiver r with the opposing magnet then supporting the opposite compartment. It is the air gap between the magnet arm that determines the weight of the fluid contained in each compartment, and therefore the increase or decrease of that air gap, by adjusting movement of the screws 75 and 76, is the means of calibration to the desired weight. In practice, each movement of the receiver which is of a relatively short range starts off very fast and proceeds at an accelerating pace so that the fluid material entering the baffle means b of the housing is enabled to maintain a continuous flow therefrom into and out of the receiver r and on through the conduit system, all without interruption or variation in its flow rate while undergoing a concurrent weighing operation.

The frame F can be made of any suitable material, however, it is desirably produced from an aluminum (or aluminum alloy) bar which is readily fashioned into the form herein described. Its front and rear legs have sufficient spring properties to securely hold the two housing sheels u and l in assembled relation and, when spread further apart slightly, to release the shells for disassembly of all working parts of the weighing mechanism. The weight control and counter device C which is operatively connected to the receiver shaft crank arm 55 by the bifurcated slot 68 of the magnet arm 65 will readily disengage therefrom when the frame front legs 35 are pulled outwardly to release the housing H for removal from the frame F; conversely, when the lower shell l, complete with its receiver r in place, is reassembled with the upper shell u within the frame, the shaft crank arm 55 is free to reenter the bifurcation 68 of the magnet arm 65, thereby restoring the operative connection therewith, all with a minimum of time and effort. This is important inasmuch as it facilitates the operation of cleaning the various working parts, of the weighing mechanism which, in many cases, is required, at least, periodically. The overall dimensions of the weighing mechanism are small, due largely to the simplicity and fewness of its several components and to the materials selected for the construction thereof, and its ready portability is attested by the fact that the weight of the entire mechanism complete, as commercially produced for the dairy industry, may be held to less than 5 lbs.

In summary then, the foregoing description sets forth one embodiment which provides a means which permits a weighing mechanism (which can be improved as hereafter described) to operate continuously upon a fluid stream of indefinite length, moving at even speed or otherwise, while contained in a conduit system, for conditioning the fluid, when necessary, to assure an even and quiet flow thereof into and out of a gravity operated scale receiver, and for exercising close control over the quantity, by weight, of fluid that is accepted into the receiver for each operation thereof, all without any deviation from the normal flow rate of the fluid moving through the conduit system. Because of the several features herein disclosed, this weighing mechanism which is compact, light and inexpensive is able to meet exacting requirements in numerous industries and provide a high degree of accuracy in the weighing of many different fluids.

It is to be understood that any type of weighing mechanism including the foregoing described mechanism which employs a shaft 51 and crank arm 55 functioning in the capacity described herein can be used in the present invention.

In conjunction with FIGS. 1–13, these represent to some degree the prior art and are illustrative of a type of weighing mechanism which can be utilized in combination with the fluid flow indicating device, both of which in combination constitute one facet of the present invention and both of which in combination with the overall fluid conduit system constitute another facet of the present invention. As previously mentioned, other weighing mechanisms can be utilized herein and even improvements to the above described mechanism such as those set forth in U.S. Pat. No. 2,917,926 may be employed.

Figure 14:
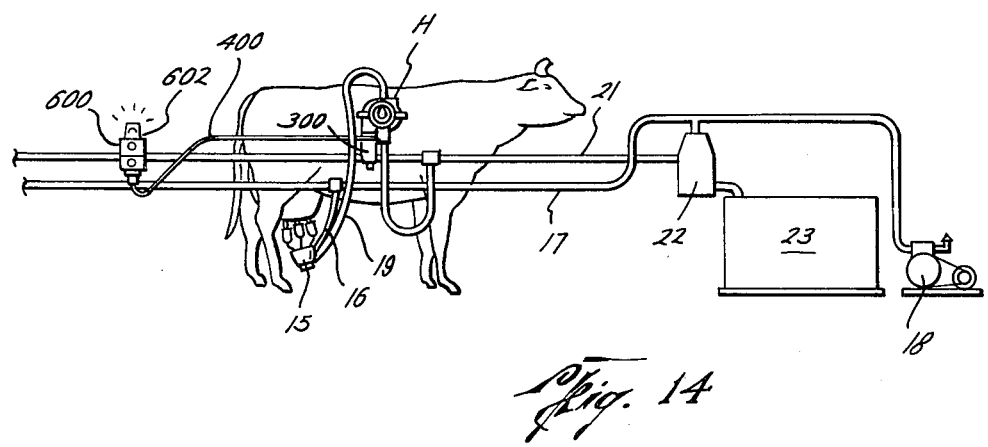
FIG. 14 illustrates more or less diagrammatically the improved fluid conduit system incorporating the flow rate indicating device as part of the continuous weighing mechanism.

Referring now to FIG. 14, this FIGURE shows the present invention incorporated into a fluid conduit system. The reference numbers of less than 91 are the same as those indicated in FIGS. 1–13. Thus, there is shown in FIG. 14 a cow being milked with milking machine 15 and fitted with line 16 which employs a vacuum thereon through line 17 via containers 22 and 23 and vacuum pump 18. The continuous weighing mechanism H is shown being fed through conduit 19. The weighing mechanism H has been modified by the incorporation of the fluid flow indicating device 300 positioned on and beneath the rocker shaft 55 in order to accurately detect the flow of milk in said mechanism and transmit a signal through wiring 400 to control box 600 containing a light 602 which is activated in the event of termination of fluid flow.

Figure 15:
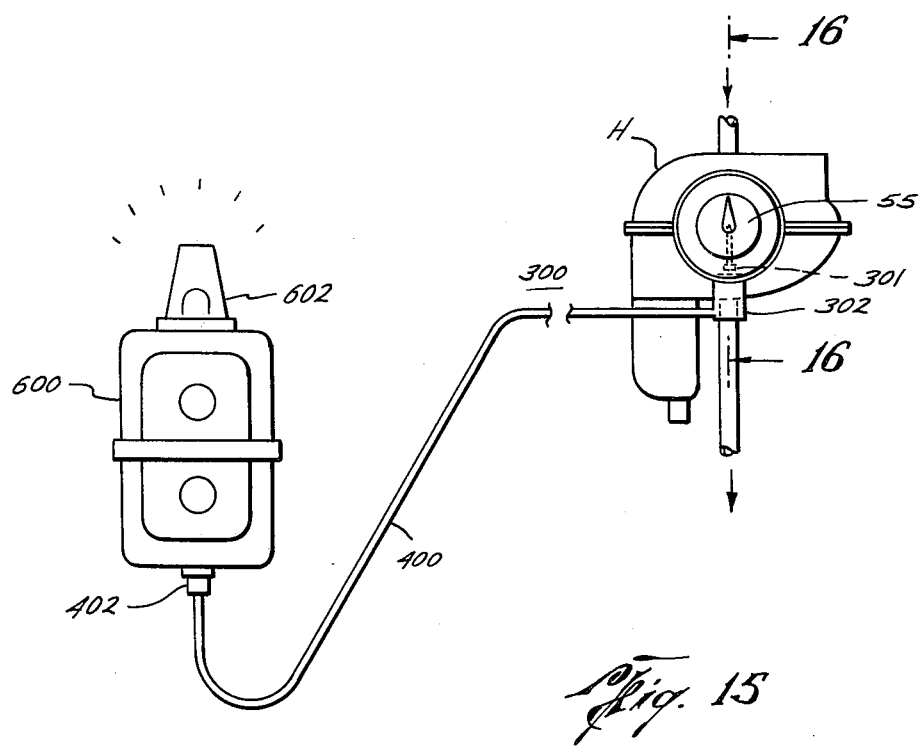
FIG. 15 is an enlarged detail of the improved weighing mechanism and which is shown connected to a housing containing the control module (herein defined) and indicating light.

FIG. 15 more specifically shows an enlargement of a portion of the fluid flow indicating device which comprises a magnet 301 detachably connected to the lower portion of shaft 55 which is, in turn, in electromagnetic relationship with switch 302 which is attached to said weighing mechanism. It is to be understood that while the attachment of switch 302 to said mechanism, the frame F or counter device C (all as shown herein) can be suitably adapted, other means for such attachment may be employed and are thus within the scope of the present invention.

Figure 16:
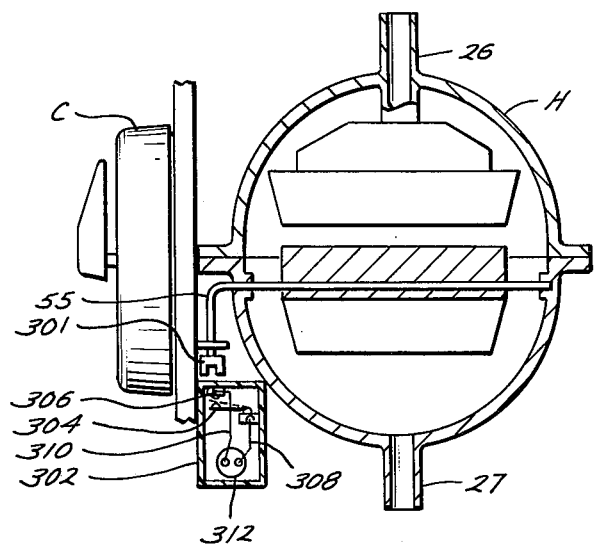
FIG. 16 is a side elevation of a continuous weighing mechanism with the fluid flow indicating device and which shows the present invention as opposed to the prior art shown in FIG. 3, without structural support.
Figure 17:
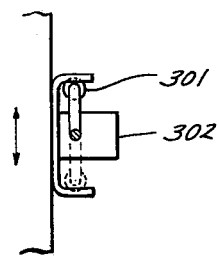
FIG. 17 is a top view of the rocker shaft showing the type movement thereof in outline form.

Referring to FIGS. 15, 16 and 17, there is shown housing H provided with inlet 26, outlet 27, counter device C, and shaft 55. Detachably connected to the lower portion of shaft 55 is magnet 301 which in turn is positioned in electromagnetic relationship with switch 302, such as a magnetic proximity switch (e.g. a reed switch). Switch 302 is, in general, located beneath magnet 301 and so positioned to be within and below the arcuate path of magnet 301 (FIG. 17). Switch 302, in turn, is detachably connected to either the counter device C, the frame F, the housing H or any combination of the three. Preferably, the switch 302 per se is detachably connected to an L shaped frame (not shown) which, in turn, is connected to the counter device C and the housing frame F, for example, by metal screws. Switch 302 houses contact points 304 and 306 (shown in "open" position) which are respectively connected to wires 308 and 310 which terminate at plug 312. This plug 312 provides an electrical connection with said wires 308 and 310 with the conductors contained in the connector cord 400 (FIG. 15) which terminates with plug 402 (FIG. 15) which is, in general, remotely disposed from switch 302.

Figure 18:
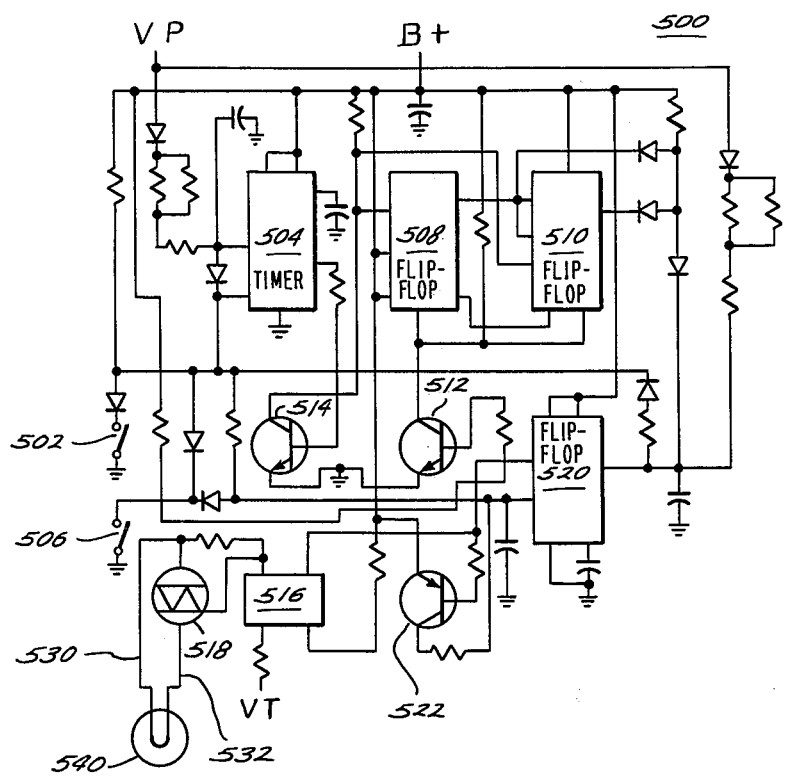
FIG. 18 is a schematic of the circuitry used in conjunction with the fluid flow indicating device

Referring to FIG. 18, there is shown a schematic of the circuitry used in conjunction with the fluid flow indicating device. This circuitry preferably is a solid state circuitry which constitutes a solid state circuit board which is referred to herein, in general, as a "control module" 500.

Referring again to FIG. 18 and the control module 500, this comprises an input circuit 502 which receives a signal from switch 302 and a "flow monitoring circuit" section which comprises two flip-flop monitoring circuits 508 and 510, both of which constitute a counting device. Associated with the two flip-flop integrated circuits 508 and 510 is a timer 504 which receives signals from flip-flops 508 and 510 and is used to "log in" on a comparative basis the pulses being sent to flip-flops 508 and 510. It is readily apparent from the schematic in FIG. 18 that suitable capacitors and resistors and electrically conductive means are provided throughout the system. The system is designed to receive in the flow monitoring circuit electrical impulses with a certain period of time between each pulse input. Specifically, each time the rocker shaft 55 containing magnet 301 rotates in an arcuate path over the surface of switch 302, the switch 302 is activated and the contact points are in a closed position (touching each other) and thus there is initiated an electrical impulse to the control module which is registered on the flip-flops 508 and 510. If on the third impulse and which the length of time between the second electrical impulse is higher than a predetermined level, an electrical signal is sent to control transistor 512 which in turn will energize an optical coupler 516 permitting a pilot voltage VT to be impressed through to a (thyristor) triac 518 and which as a result thereof activates the alternating current power lines 530 and 532 thus energizing a secondary device 540 such as light 602 (see FIG. 15).

In another facet of the present invention and also referring to FIG. 18 and the control module 500, there is also provided an "override section timer" circuit which comprises another or third flip-flop integrated circuit 520 which also monitors the length of time between the pulses heretofore described but is preset to allow a substantially greater lapse of time between pulses. For example, some animals may have a very fast let down with almost total shut off or termination of fluid flow which may not give a second or third electrical impulse and thus be monitored by flip-flop integrated circuits 508 and 510. In this override section then, if a signal is not received from the continuous weighing mechanism as modified, within, for example, a 30 second period (as opposed, for example, to signal being sent every 7 ½ seconds), the override section flip-flop integrated circuit 520 sends a signal through to a control transistor 522 which in turn will energize the optical coupler 516 permitting a pilot voltage VT to be impressed through the triac 518 in the manner heretofore described and as a result thereof energizes the alternating current power lines 530 and 532. It is to be understood and it is within the scope of the present invention that the rate of flow to be sensed as a product of time span between impulses is adjustable.

It is within the scope of the present invention that the actuation of power lines 530 and 532 can automatically function to (1) turn on a red warning light, (2) stop the milking operation, (3) dye-spray the cow's flank, and/or (4) open a power exit gate.

In a preferred embodiment of the present invention, the actuation of power lines 530 and 532 turns on a red warning light such as shown in FIG. 15 and as indicated by 602.

In summary then, the present invention permits the constant monitoring of the fluid flow of an animal's milk during the milking period to detect the milked-out end point. The appropriate output of the detection will give a visual or recorded means readily available to the plant operator and automated mechanical equipment can thereafter be actuated for the purposes set forth herein or any other purpose associated with the overall operation.

In practice, the present invention combination has resulted in a very unique, accurate and effective means to achieve the results heretofore set forth. For example, it has been found with the utilization of the continuous weighing mechanism and fluid flow indicating device that when one quarter pound increments of milk are continuously discharged from the weighing mechanism, electrical impulses are generated every 7 ½ seconds and after the third cessation of said impulses, the warning light is energized. During the same time, the override section timer is set for 30 seconds.

In another facet of the present invention, the control module (solid state circuit board) is adapted to be contained in a housing such as a control box 600 fitted with (1) a "mother board" which includes a voltage transformer VT and (2) a "warning" light 602. The control module is detachably connected to the "mother" board which is suitably adapted to receive the signal from the switch and transmit it to the input circuit of the control module and also transmit a signal from said module to activate external AC lines, (i.e. an outside power supply) which in turn energizes said light.

In conjunction with the applicants' concurrently filed patent application entitled "Temperature Indicating Device For Fluid," it is also within the scope of the present invention that the above described control box 600 can also provide for the mother board to house a second control module (described in this latter mentioned patent application) which operates independent of the herein described control module, but it is, however, capable of activating the alternating current lines which in turn energizes other devices such as the light 602.

The present invention may be embodied in other specific forms without departing from the spirit or essential characteristics therof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A fluid flow indicating device for use with a conduit system wherein a fluid material is moved and is weighed by a continuous weighing mechanism, which contains a fluid receiver mounted upon a rocker shaft, said receiver and a portion of said rocker shaft contained within a housing which is supported by a frame, and comprising (a) a magnet which is detachably connected to said rocker shaft on that portion thereof which is outside said housing; (b) an electromechanical switch which is adapted to be mounted on said frame, said switch being in electromagnetic relationship with said magnet so that movement of said magnet can activate said switch; (c) a control module containing input an output circuits, disposed remotely from said switch and interconnected therewith by suitable electrically conductive means, and which control module consists of a solid state timing device which comprises (1) a flow monitoring circuit which comprises two flip-flop integrated circuits for counting an incoming electrical signal; (2) a reference timer integrated circuit which comprises a comparative timer which registers and compares the signals of said two flip-flop integrated circuits; (3) a control transistor which receives a signal from said flip-flop integrated circuits; (4) an optical coupler which receives a signal from said control transistor upon preset circuitry conditions and which is energized thereby; (5) a triac which is operative via a pilot voltage through the energized optical coupler and which triac in turn activates an electrical power supply through the output circuit and (6) an override section timer circuit which monitors the length of time between signals received in said flow monitoring circuit and upon preset circuitry conditions allows a greater lapse of time between said signals, and suitable electrically conductive means between items (1) and (6), said control module adapted to receive a signal from said switch through said input circuit and upon preset circuitry conditions, activate an outside electrical power supply through the said output circuit as described in item (5); and (d) a second housing which is adapted to detachably contain said control module.

2. The apparatus as set forth in claim 1 wherein said override section timer circuit comprises (a) a third flip-flop integrated circuit which also receives a signal from said switch and (b) a second control transistor which receives a signal from said third flip-flop integrated circuit and upon preset circuitry conditions also energizes said optical coupler and triac in the manner described in items (4) and (5) in claim 1.

3. A continuous weighing mechanism comprising (A) a housing and frame for support thereof (B) a fluid receiver mounted upon a rocker shaft, said fluid receiver and a portion of said rocker shaft adapted to be contained within said housing and (C) a fluid flow indicating device which comprises (i) a magnet which is detachably connected to said rocker shaft on that portion thereof which is outside said housing; (ii) an electromechanical switch which is adapted to be mounted on said frame, said switch being in electromagnetic relationship with said magnet so that movement of said magnet can activate said switch; (iii) a control module containing input and output circuits, disposed remotely from said switch and interconnected therewith by suitable electrically conductive means, and which control module consists of a solid state timing and monitoring device which comprises (1) a flow monitoring circuit which comprises two flip-flop integrated circuits for counting an incoming electrical signal; 2) a reference timer integrated circuit which comprises a comparative timer which registers and compares the signals of said two flip-flop integrated circuits; (3) a control transistor which receives a signal from said flip-flop integrated circuits; (4) an optical coupler which receives a signal from said control transistor upon preset circuitry conditions and which is energized thereby; (5) a triac which is operative via a pilot voltage through the energized optical coupler and which triac in turn activates an electrical power supply through the output circuit and (6) an override section timer circuit which monitors the length of time between signals received in said flow monitoring circuit and upon preset circuitry conditions allows a greater lapse of time between said signals, and suitable electrically conductive means between items (1) and (6), and said control module adapted to receive a signal from said switch through said input circuit and upon preset circuitry conditions, activate an outside electrical power supply through the said output circuit as described in item (5); and (iv) a second housing which is adapted to detachably contain said control module.

4. The apparatus as set forth in claim 3 wherein said override section timer circuit comprises (a) a third flip-flop integrated circuit which also receives a signal from said switch and (b) a second control transistor which receives a signal from said third flip-flop integrated circuit and upon preset circuitry conditions also energizes said optical coupler and triac in the manner described in items (4) and (5) in claim 3.

5. In a continuous weighing mechanism for fluids moving through a conduit, comprising a housing, supported by a frame, providing a chamber having aligned cylindrical bearings carried by opposite walls thereof and formed at its top and bottom, respectively, with an inlet and an outlet, a receiver rockable through a fixed circular path and adapted in one predetermined position to receive fluid from the inlet and, when in a second predetermined position, to discharge the fluid by gravity for drainage through the outlet, a rotatable shaft whereon the receiver is mounted fast for said rocking movement with the turning of the shaft, the shaft and receiver being formed cooperatively effecting said fast mounting while permitting the receiver to be freely separable from the shaft by a radial movement relative thereto, the shaft having end portions lying in the bearings outwardly rounded from and closely journaled in and engaging in annular line contact with the bearings for free rotation therein under conditions of varying distortion and relative movement of the areas of the housing walls having the bearings therein, and a counter device connected with the shaft for operation thereby with each rotary movement thereof, the improvement which consists in a fluid flow indicating device comprising (a) a magnet which is detachably connected to the end of the shaft which is connected with the counter device; (b) and electromechanical switch which is adapted to be mounted on said frame, said switch being in electromagnetic relationship with said magnet so that movement of said magnet can activate said switch; (c) a control module containing input and output circuits, disposed remotely from said switch and interconnected therewith by suitable electrically conductive means and which control module consists of a solid state timing and monitoring device which comprises (1) a flow monitoring circuit which comprises two flip-flop integrated circuits for counting an incoming electrical signal; (2) a reference timer integrated circuit which comprises a comparative timer which registers and compares the signals of said two flip-flop integrated circuits; (3) a control transistor which receives a signal from said flip-flop integrated circuits; (4) an optical coupler which receives a signal from said control transistor upon preset circuitry conditions and which is energized thereby; (5) a triac which is operative via a pilot voltage through the energized optical coupler and which triac in turn activates an electrical power supply through the output circuit and (6) an override section timer circuit which monitors the length of time between signals received in said flow monitoring circuit and upon preset circuitry conditions allows a greater lapse of time between said signals, and suitable electrically conductive means between items (1) and (6), and said control module adapted to receive a signal from said switch through said input circuit and upon preset circuitry conditions, activate an outside electrical power supply through the said output circuit as described in item (5); and (d) a second housing which is adapted to detachably contain said control module.

6. The apparatus as set forth in claim 5 wherein said override section timer circuit comprises (a) a third flip-flop integrated circuit which also receives a signal from said switch and (b) a second control transistor which receives a signal from said third flip-flop integrated circuit and upon preset circuitry conditions also energizes said optical coupler and triac in the manner described in items (4) and (5) in claim 5.

* * * * *